No. 695,287. Patented Mar. 11, 1902.
D. DAVY.
RAISING OR LOWERING APPARATUS FOR MINES OR THE LIKE.
(Application filed Dec. 7, 1901.)
(No Model.) 5 Sheets—Sheet 1.
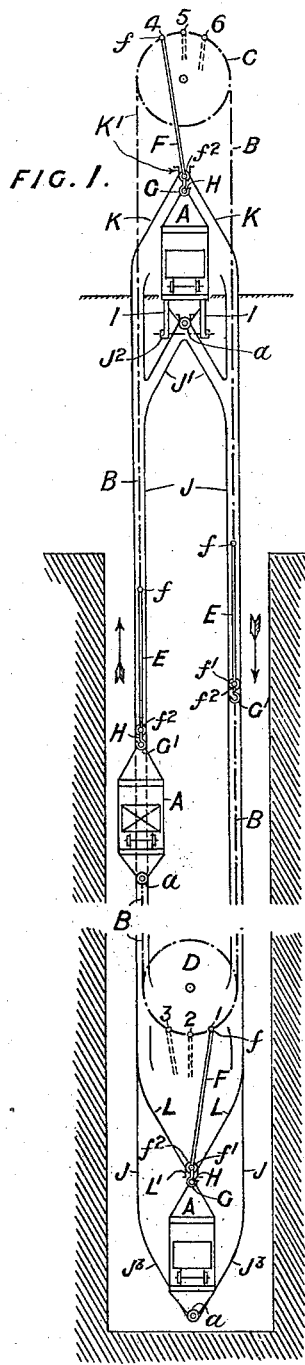
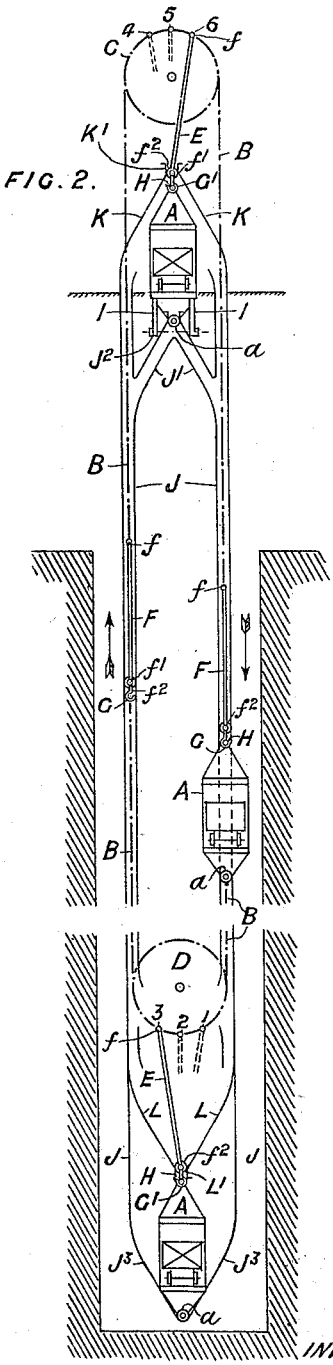
WITNESSES:
INVENTOR
David Davy
BY
ATTORNEYS No. 695,287. Patented Mar. 11, 1902.
D. DAVY.
RAISING OR LOWERING APPARATUS FOR MINES OR THE LIKE.
(Application filed Dec. 7, 1901.)
(No Model.) 5 Sheets—Sheet 2.
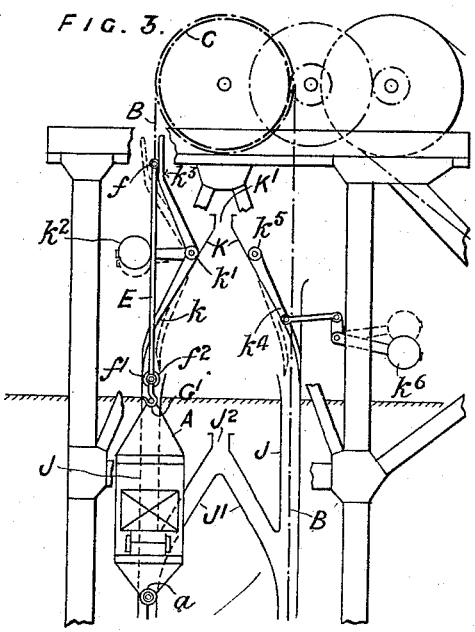
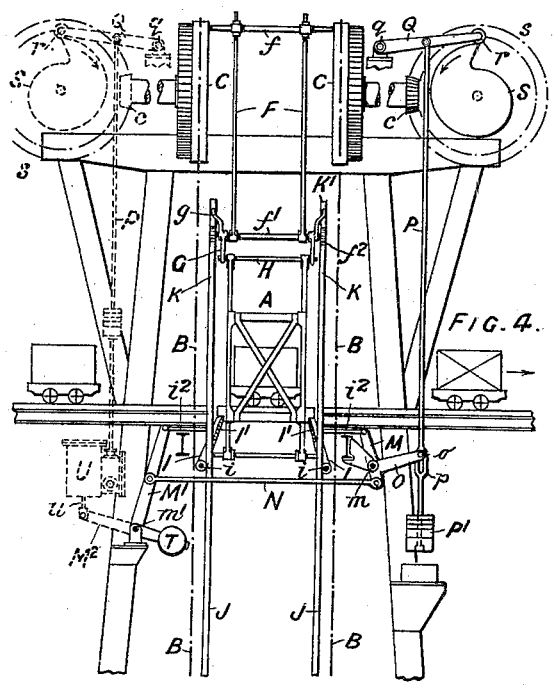
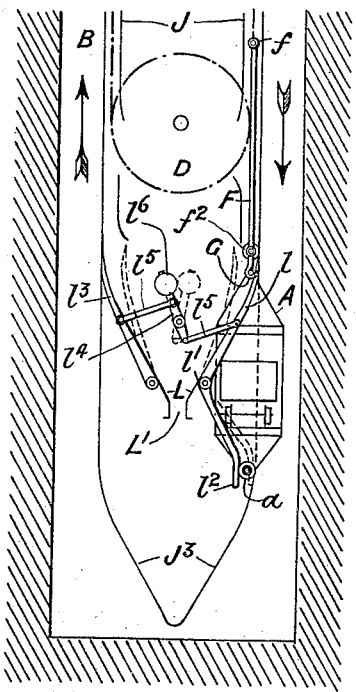
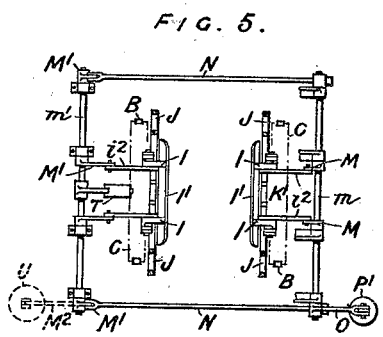
WITNESSES:
INVENTOR
David Davy
BY
ATTORNEYS
THE NORRIS PETERS CO., PHOTO-LITHO., WASHINGTON, D. C.

No. 695,287. Patented Mar. 11, 1902.
D. DAVY.
RAISING OR LOWERING APPARATUS FOR MINES OR THE LIKE.
(Application filed Dec. 7, 1901.)
(No Model.) 5 Sheets—Sheet 3.
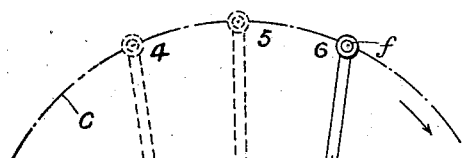
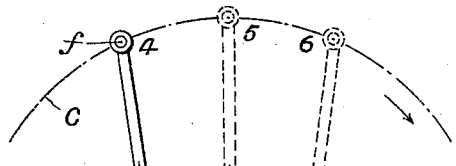
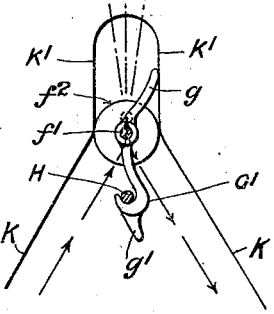
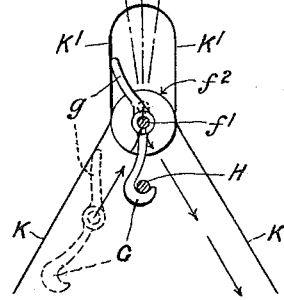
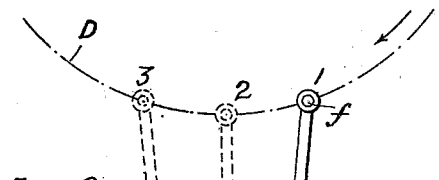
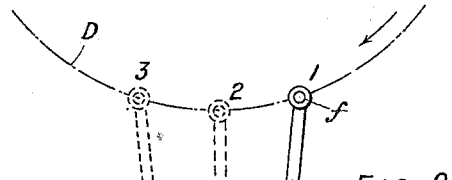
WITNESSES:
INVENTOR
David Davy
BY
ATTORNEYS No. 695,287. Patented Mar. 11, 1902.
D. DAVY.
RAISING OR LOWERING APPARATUS FOR MINES OR THE LIKE.
(Application filed Dec. 7, 1901.)
(No Model.) 5 Sheets—Sheet 4.
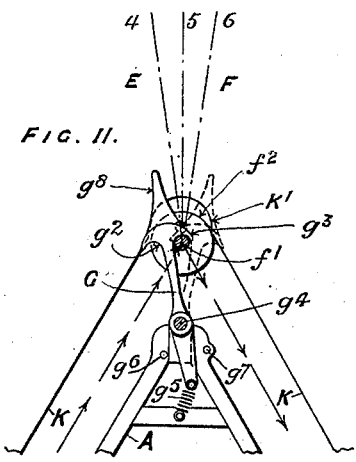
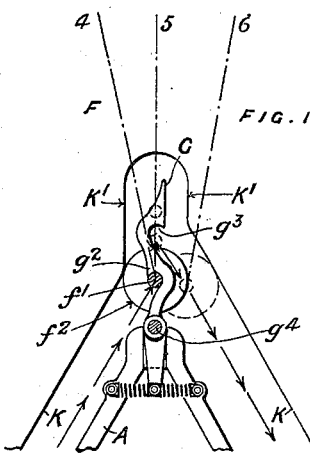
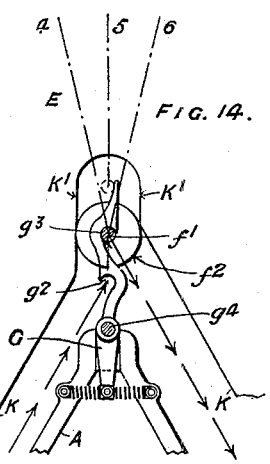
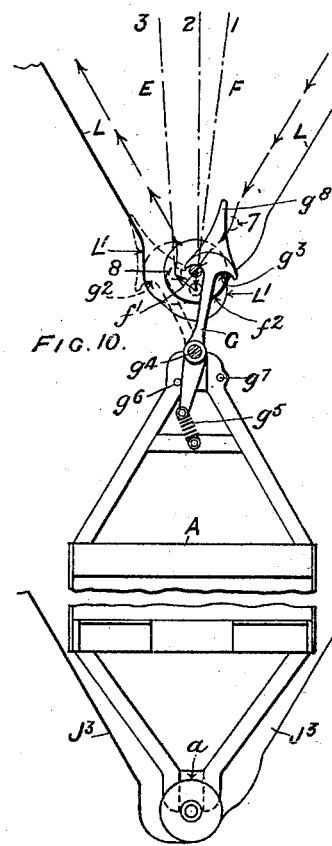
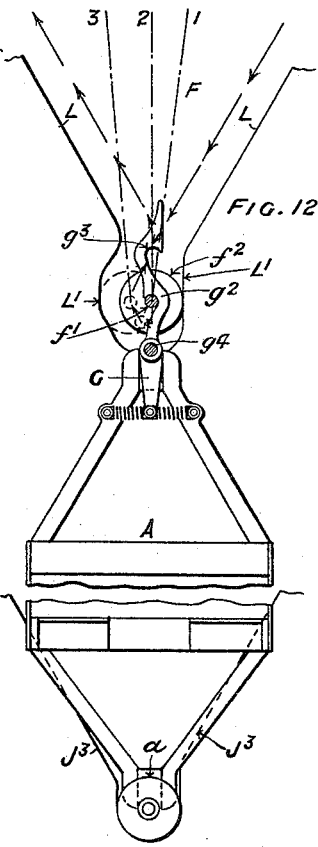
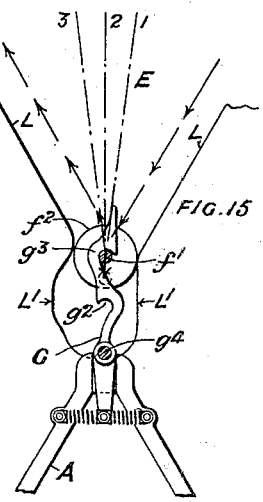
WITNESSES:
C. E. Holske
P. D. Rollhaus
INVENTOR
David Davy
BY
Munn
ATTORNEYS No. 695,287. Patented Mar. 11, 1902.
D. DAVY.
RAISING OR LOWERING APPARATUS FOR MINES OR THE LIKE.
(Application filed Dec. 7, 1901.)
(No Model.) 5 Sheets—Sheet 5.
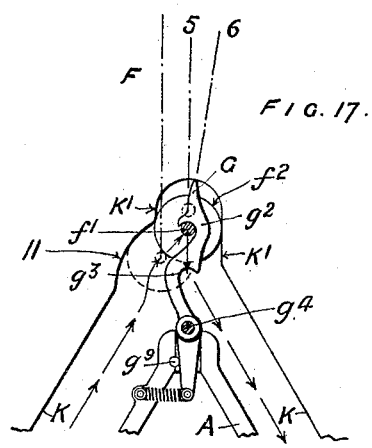
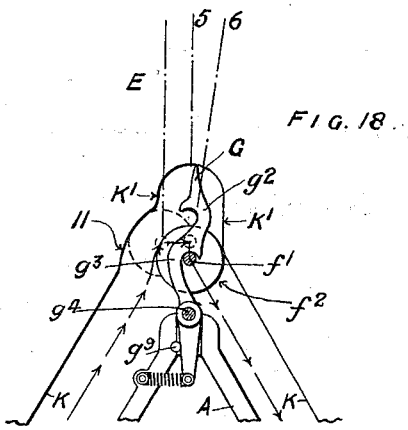
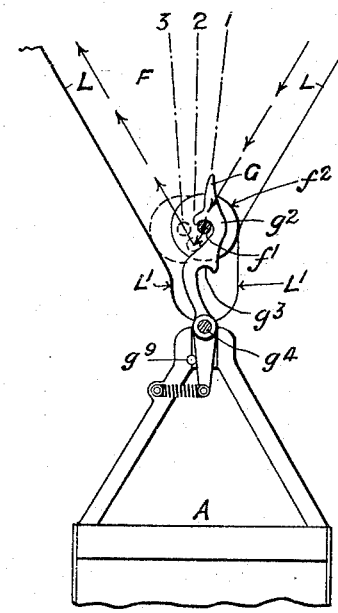
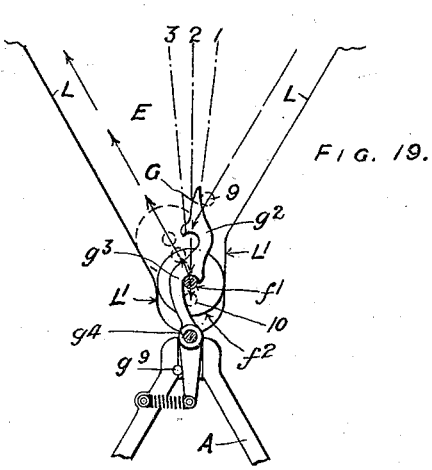
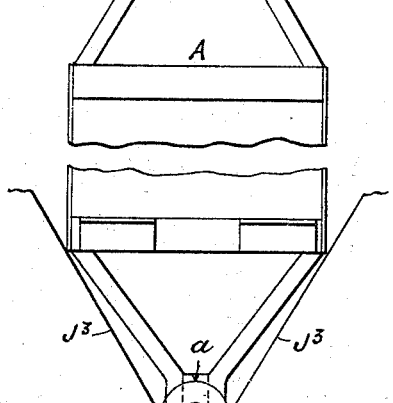
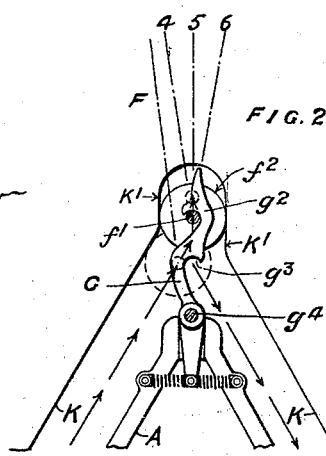
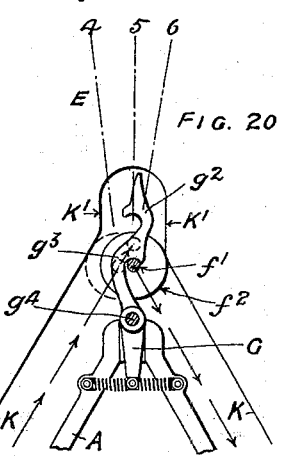
WITNESSES:
INVENTOR
David Davy
BY
ATTORNEYS

UNITED STATES PATENT OFFICE.

DAVID DAVY, OF SHEFFIELD, ENGLAND.

RAISING OR LOWERING APPARATUS FOR MINES OR THE LIKE.

SPECIFICATION forming part of Letters Patent No. 695,287, dated March 11, 1902.

Application filed December 7, 1901. Serial No. 85,012. (No model.)

*To all whom it may concern:*

Be it known that I, DAVID DAVY, a subject of the King of Great Britain, residing at Broomcroft, Parkhead, Sheffield, England, have invented new and useful Improvements in Raising or Lowering Apparatus for Mines and the Like, of which the following is a specification.

My invention relates to continuously-running apparatus such as that for which former Letters Patent were granted to me, dated November 14, 1899, No. 637,092, for raising and lowering in mines and the like; and my present improvements have for object to enable longer pauses to be made by the cages at the top and bottom landing-stages for the purpose of affording more time for loading and unloading the cages without interrupting the movement of the chains and their driving-gear. By this means I am enabled to considerably reduce the dimensions of the chain-pulleys, and consequently the space required for the installation of the apparatus, as well as the cost of construction, and to employ cages carrying greater loads.

The cages are suspended from pendulous slings attached to the chains, and the chains are continuously driven, as before; but instead of the cages being permanently connected to their slings and only coming to rest during the short periods while the points of attachment of the slings to the chains are passing through arcs of limited extent around the chain-pulleys the cages on reaching the landing-stages are wholly disconnected and left at rest for a period of time amply sufficient for the loading and unloading operations, after which the cages are picked up again and caused to make a fresh journey, the slings being for this purpose in number double that of the cages, so that in the circuit of the chains the slings will be in work and idle alternately. On reaching the one landing-point each cage is set down and detached from the sling by which it was brought to that point, and after remaining there at rest while the chains travel a distance equal to that between two consecutive slings the cage is picked up again by the next succeeding sling of the series, carried to the other landing-point, and there deposited, to be again picked up by the next sling, and so on continuously.

The invention will be described with reference to the accompanying drawings, forming part of this specification, wherein—

Figures 1 and 2 are diagrammatic views illustrating the method of operation in principle. Fig. 3 illustrates the switches at the upper and lower ends of the guides for the slings and cages. Fig. 4 shows in elevation the cage-supporting mechanism at the upper landing-stage. Fig. 5 is a plan of the same. Figs. 6, 7, 8, and 9 illustrate the operation of hooks pivoted to the slings. Figs. 10 and 11 illustrate double hooks pivoted to the cages. Figs. 12 to 15, 16 to 19, and 20, 21 show other forms of double hooks pivoted to the cages.

The cages are under the control of guides, whereby they are caused to deviate from the planes of motion of the chains and to assume positions midway between the ascending and descending chain members on reaching the landing-stages at the top and bottom of the shaft. The cages may be landed at the pit top upon props adapted to automatically engage with and support the cage on passing through the hatchway, the props being disengaged by power at the proper moment. The supports for the cages at the pit bottom would be fixed.

In all the drawings the same letters of reference indicate the same or similar parts.

A represents the cages; B, the pair of endless chains passing over pairs of chain-pulleys C D at the head and foot of the pit-shaft.

F represents the cage-slings, pivoted at $f$ to the chains B, means being provided for effecting detachable connection between the slings and the cages and for guiding the slings and cages, as hereinafter described.

Referring to Figs. 1 and 2, the connection between the slings and the cages may be considered as formed each by a single hook G or G' on the lower end of the sling engaging a bar H, fixed on the top of the cage, the points of the hooks being alternately directed in opposite directions in the plane of vibration of the slings, so as to be respectively adapted those G' for picking up a cage at the lower landing-stage and for setting it down at the upper landing-stage and those G for picking up a cage at the upper landing-stage and setting it down at the lower landing-stage, these operations being performed as hereinafter described.

The pair of chain-pulleys C above the pit-head are continuously driven, so as to cause the pair of endless chains B to travel continuously at a suitable speed. The cages A are guided by rollers $a$, running in guides, and the hooked ends of the slings F are supposed to be similarly guided, so as to cause the slings (whether in work or idle) to pass through the inclined positions shown while their pivots $f$ are passing over the upper pair of pulleys C and below the lower pair of pulleys D, the cages attached to the slings being thus brought on arrival at the upper and lower landing-points into a central position between the ascending and descending members of the chains, while the cages are also constantly maintained in the upright position.

Starting with the cage at the lower part of Fig. 1, it is to be understood that the cage here shown (which contains an unloaded corve) has just been guided in its descent to the central position and has been deposited at the pit bottom and that the sling F, which brought it to that position, has then reached the inclined position at which it is shown. While (owing to the continued motion of the chain) the pivot $f$ of the sling F thereafter passes through the arc 1 2 3, the hook G will first descend still farther, and so become detached from and will then rise clear of the cage-bar H, leaving the cage at rest until the hook G' of the next succeeding sling E is brought by the chains and guides into position of engagement for the purpose of picking up and raising the said cage, wherein the unloaded corve has meanwhile been replaced by a loaded one, as shown at the bottom of Fig. 2. The loaded cage on being raised to the top landing-point, as shown at the upper part of Fig. 2, is supposed to have been first brought to the central position and then to have been raised above and deposited on supports I while the pivot $f$ of the sling was passing through the arc 4 5 6, from which latter point the further descent of the hook G' will cause said hook to become disengaged from the cage-bar H, leaving the cage at rest until the hook G of the next succeeding sling F shall have been brought by the chains and guides into position of engagement, as shown at the top of Fig. 1, for the purpose of picking up and lowering the cage, wherein the loaded corve has meanwhile been replaced by an empty one. The engagement of the hook G with the cage-bar H having been effected, the cage becomes lifted off its supports, as the pivot $f$ of the sling now passes through the arc 4 5 6, and the supports are then automatically moved out of the way to permit of the cage being lowered.

In practice the slings would each be formed of a pair of side members attached to an upper cross-bar $f$, pivotally attached at its ends to the two chains B, the lower ends of the side members being connected by another cross-bar $f'$, the hook connection between the slings and cages being in pairs, one near either side, the two acting together as one. For instance, the cross-bar $f'$ may have a pair of hooks G or G' pivoted on it, as shown in Figs. 4, 6, 7, 8, 9, for engagement with the cage-bars H, this lower cross-bar $f'$ extending beyond the side members and carrying guide-rollers $f^2$, that engage in guides J, extending vertically through the shaft at either side of and in the planes of the ascending and descending members of the chains B, as shown in Figs. 1 and 2, these guides J also serving to guide the rollers $a$, mounted beneath the cages. Near the upper part of the guide J branch guides J' for the guidance of the rollers $a$ lead from the guides J and converge to a short vertical guide J² at the median plane between the ascending and descending chain members. From the points of divergence of the branch guides J' the main guides J continue vertically upward and lead to converging guides K, parallel to the guides J' and terminating, like them, in a short central vertical guide K', these upper converging guides K being for the guidance of the rollers $f^2$ of the slings, and their vertical distance from the guides J' corresponding to the axial distance between the rollers $f^2$ and $a$. As the chains B are situated outside of these guides and as the pivotal bars $f$ of the slings extend from chain to chain, it follows that the path of the said bars (which coincides with the vertical guides J and remains vertical in direction throughout except in passing around the pulleys C D) necessarily intersects the converging guides K, and in order to give passage to the said bars $f$ these converging guides are each in part formed by a movable member or switch so actuated as at proper times to open for the passage of the bars $f$ and to close for the guidance of the rollers $f^2$. For this purpose the switch $k$, Fig. 3, at the ascending side is pivoted, as at $k'$, and weighted, as at $k^2$, whereby it is normally caused to stand in the open position, (shown in dotted lines in Fig. 3,) and it is provided with a tailpiece, as at $k^3$, extending in the path of the bars $f$, so as to be struck thereby in order at the proper moment to cause the switch $k$ to be shifted into proper position to guide the roller $f^2$ (pertaining to the sling E or F, whose pivot $f$ is then about to enter on the pulley C) toward the central guide K'. The switch $k^4$ at the descending side is pivoted at $k^5$ and weighted, at at $k^6$, so as to normally stand in the position shown in full lines, and thus lead the roller $f^2$ to the vertical guide J, the switch being free to yield to the pressure of the cross-bars $f^2$ as the latter pass down.

At the foot of the shaft the outer walls only of the main guides J are continued below the pulley D and converge, as at J³, for the guidance of the cage guide-roller $a$, and at a suitable height above and parallel to J³ other converging guides L are provided for the guidance of the sling-roller $f^2$, these guides L terminating at their lower end in a short central vertical guide L'. The converging guides L are formed in part by switches adapted both to give passage to the cage-rollers $a$ and to guide the sling-rollers $f^2$. At the descending side the switch $l$ is pivoted at $l'$ and provided with a tailpiece $l^2$. The switch normally stands in the open position shown in dotted lines, so as to give passage to the guide-roller $a$ of the next descending cage, whereas the tailpiece $l^2$ stands in the path of said roller, so as to be moved thereby for the purpose of setting the switch $l$ in the path of the roller $f^2$ of the sling from which that cage is suspended. The switch $l^3$ at the ascending side is coupled by a rock-lever $l^4$ and links $l^5$ with the switch $l$, so that the two switches will be moved simultaneously and in opposite directions, with the result that when the switch $l$ is moved as last mentioned the switch $l^3$ is moved into position to guide the roller $f^2$ to the main guide J at the ascending side, when the cage after having been deposited at the lower landing-stage is picked up again and commences its ascending movement. In this position of the switch $l^3$ it stands in the path of the roller $a$, so that as the cage rises the said roller will pass behind the switch and move it to the dotted position, thereby also returning the switch $l$ to the dotted position in readiness for the next descending cage. The upper arm of the lever $l^4$ is prolonged and weighted, as at $l^6$, so as to fall over to the one side or the other of the vertical through the lever-axis, and thus retain the switches in whichever position they may be set.

Referring now to Figs. 6, 7, 8, 9, the guidance and operation of the slings E F is as follows, it being supposed that the hooks G G' point in opposite directions alternately and are pivoted on the lower cross-bars $f'$ of the slings: Each hook is in this case provided with a tailpiece $g$, extending upwardly and rearwardly of the hook, while the hooks G' are also provided with a nosepiece $g'$ for the purpose of effecting engagement with the cage-bar H. Figs. 6 and 7 illustrate the operation of picking up loaded cages at the pit bottom and setting them down at the top. As the sling-pivot $f$ passes around the under side of pulley D the sling guide-roller $f^2$ runs down the inclined guide L, formed by the switch $l$, and enters the central vertical guide L'. The inclined nose $g'$ of the pendent hook G' on striking the cage-bar H causes the hook to be swung back in readiness to engage with said bar, which it does while the sling-pivot $f$ is passing through the arc 1 2 3 and the sling E is swinging over from the one inclined position to the other, (indicated by the lines E E'.) To insure the engagement of the hook G' with the cage-bar H, the central vertical guide L' is slightly enlarged at the lower part toward the ascending side, so as to permit the guide-roller $f^2$ to pass to the position indicated in dotted lines, so as to avoid pressure of the tail end $g$ of the hook against the opposite face of said vertical guide, the path traveled by the axial center of the guide-roller $f^2$ being indicated by the arrows. The loaded cages are disconnected for the purpose of being set down at the pit top, as shown in Fig. 7. The roller $f^2$ after ascending the inclined guide K reaches the position shown, and then the axis $f'$ of the hook receives a slight up-and-down motion while the pivot $f$ is passing through the arc 4 5 6 on the chain-pulley C and the sling is passing from the one to the other of the oppositely-inclined positions E E', this vertical motion being just sufficient to enable the supports to be introduced beneath the cage and the cage to be set down thereon during the movement of the pivot $f$ through the said arc. The hook G' by its further downward movement then becomes disengaged from the cage-bar H in consequence of its tail end $g$ bearing against the vertical face of the guide K', while the pivot $f'$ of the hook is constrained by the inclination of the sling to follow the downwardly-inclined path indicated by the arrows.

The operation of picking up the unloaded cage which has been set down at the pit top, as last described, is illustrated in Fig. 8 and is performed by the hook G of the next following sling F. As the guide-roller $f^2$ of this sling is caused to ascend the inclined guide K by the passage of the pivot $f$ of the sling onto the pulley C the tail $g$ of the hook G comes in contact with the said guide and the hook G is swung to the position shown in dotted lines until on the tail end $g$ entering the vertical guide K' the hook is permitted to resume its vertical position and is thereby caused to engage with the cage-bar H. This occurs when the sling attains the position F, and during the passage of the sling from the position F to F' the hook G receives a vertical up-and-down motion, whereby the cage is first lifted off its supports and is then (the supports having meanwhile been removed) lowered, the angular position of the sling causing the guide-roller $f^2$ to follow the direction of the inclined guide K toward the descending side, as indicated by the arrows.

The setting down of the unloaded cage at the pit bottom is effected as shown in Fig. 9. The guide-roller $f^2$ descends the inclined guide L and passes down the central vertical guide L' to the position shown, whereupon the cage comes to rest upon its landing-support, while during the passage of the sling from the position F to the position F' the pivot $f'$ of the hook descends somewhat farther and in rising again falls over toward the enlargement on the ascending side of the vertical guide L', so that the tail end $g$ of the hook being already in contact with the guide the hook by the horizontal movement of its center becomes swung into the position shown in dotted lines, whereby it is disengaged from the cage-bar H, the path of the pivot $f'$ being indicated by the arrows.

Instead of the hooks being oppositely directed alternately and pivoted upon the bars $f'$ of the slings E F they may be pivoted upon the cages and engage with the sling-bars $f'$, the hooks being double or of inverted-V form, so as to serve both for picking up and setting down the cages at both landing-stages, such a double form of hook being shown at $g^2\ g^3$ in Figs. 10, 11, which illustrate the picking-up and setting-down operations at both landing-stages.

The double hook G is pivoted at $g^4$ to the cage-frame and provided with a tailpiece acted on by a spring $g^5$ in such manner that the spring tends to retain the hook in the one or the other of the inclined positions to which it may be moved, such movement being limited by stops $g^6\ g^7$. When an unloaded cage has been brought to the position shown in Fig. 10 and landed on fixed supports, the disengagement of the sling from the member $g^2$ of the book G is effected by the movement of the sling-bar $f'$ through the path indicated by the arrows as the sling F passes through the successive positions 1 2 3, as before explained, the guide L' for the roller $f^2$ at the ascending side being shaped as shown to permit of this movement, while the hook G remains in the position shown in full lines. The picking up of the cage by the next succeeding sling E is as follows: When the bar $f'$ of that sling (guided by its roller $f^2$ descending the inclined guide L) reaches the position 7, it strikes the nose $g^8$ of the hook G, which is then standing in its path, and throws the hook over to the other position, as shown in dotted lines. The sling E then passes through the successive positions 1 2 3, as before, and when it reaches position 3 the sling-bar $f'$, which has followed the path indicated by the arrows and so reached position 8, becomes engaged with the other member $g^3$ of the double hook, thus picking up the cage.

When the loaded cage arrives at the top landing-stage, the disengagement of the sling from the hook is effected, as shown in Fig. 11. Under the weight of the cage the hook G will have assumed the intermediate position shown in full lines; but as soon as the cage is landed on the supporting-props by the vertical rising-and-falling movement of the sling-bar $f'$, as the sling passes through the positions 4 5 6, the hook G falls back until its tail strikes the stop $g'$, whereupon the hook member $g^3$ becomes disengaged from the sling-bar $f'$. The hook G is thus left in readiness for the engagement of its member $g^2$ by the bar $f'$ of the next sling F. When so engaged, the hook assumes the dotted position under the weight of the cage.

Figs. 12, 13, 14, 15, and 16, 17, 18, 19 illustrate the action of two other arrangements of double hook, (pivoted to the cage at $g^4$,) in which the two hooked members $g^2\ g^3$, although oppositely directed, are situated one above the other, the hooks in the one arrangement being the reverse of the other as regards the relative positions of the hooked members performing similar functions, the member $g^2$, which comes into use when picking up the unloaded cage at the pit top and setting it down at the pit bottom, being in the case shown in Figs. 12 to 15 below, and in the case shown in Figs. 16 to 19 above, the member $g^3$, which comes into use in picking up the loaded cage at the pit bottom and setting it down at the pit top. In each case the slings E and F differ in length to an extent corresponding to the vertical distance between the hooked members $g^3\ g^2$, with which they respectively engage. In Figs. 16 to 19 the hook is normally held in the vertical position against a stop $g^9$ by a spring. The operations of setting down and picking up the cages are performed as before described. In Figs. 12 and 16, which illustrate the operation of setting down the unloaded cage at the pit bottom, the sling-bar $f'$, guided by its roller $f^2$, becomes disengaged from the hook member $g^2$ as the sling F passes through the positions 1 2 3, the guides L' L at the ascending side being so formed as to allow this to take place. In the operation of picking up the cage at the pit bottom (illustrated in Figs. 15 and 19) the bar $f'$ of the next succeeding sling E strikes the nose of the hook, as shown at 9, and, sliding down the hook, throws the latter over toward the left, and then after descending to the extreme position 10 rises to the position shown in full lines, wherein the bar $f'$ is in engagement with the member $g^3$ of the hook, which has meanwhile been returned to vertical position by its spring.

The operation of setting down the cage at the pit-head and the disengagement of the sling (illustrated in Figs. 14 and 18) is as follows: The sling-bar $f'$, following the path indicated by the arrows, reaches its highest position when the sling E reaches the mid-position 5 and then descends to the position shown in full lines as the sling passes through the arc 5 6, Fig. 2, after which, by the further movement of the sling E as it is carried around by the pulley C, the sling-bar $f'$ quits the hook $g^3$ and follows the descending inclined guide K, leaving the cage supported on the props and the hook in the position shown in readiness for picking up. In the operation of picking up and lowering the cage at the pit top (shown in Figs. 13 and 17) the bar $f'$ of the next sling F, guided by its roller $f^2$, ascending the inclined guide K, passes clear of the lower part of the hook (the guide being slightly recessed, as at 11, for this purpose) and engages with the hook member $g^2$, then after rising to the highest position descends to the position shown in full lines, and thence follows the descending path along the inclined guide K.

Figs. 20 and 21 show an alternative arrangement for effecting the operations respectively of setting down and picking up cages at the pit top. In this arrangement the hook G is held vertical by springs without the use of a stop, as at $g^9$, Figs. 16 to 19, so that the hook being capable of being swung toward either side the recessing of the ascending guide K, as at 11, Figs. 17 and 18, is avoided, and consequently the sling-bar $f'$, whether carrying the loaded cage, as in Fig. 20, or proceeding to pick up the cage at the pit top, as in Fig. 21, is in each case guided directly to the central position shown, the remainder of these operations being effected as before.

The preferred construction of the mechanism for operating the cage supports at the upper landing-stage is illustrated in Figs. 4 and 5. The pairs of props I, on which the cage A is supported when in the position shown, are pivoted at $i$ to the framing of the landing-stage, the upper ends of the two props of a pair being connected by bars I', having outwardly-curved ends $i'$, (see Fig. 5,) so as the better to guide the cage in its lateral motion between the props. The pairs of props I are coupled each by a link $i^2$ to a lever, the one lever M, which is fulcrumed at $m$, being so connected by a link N to the other lever N', which is fulcrumed at $m'$, that the two pairs of props move inward and outward together. The lever M has an arm O, carrying a pin $o$, which engages in the slot $p$ of a weighted rod P, hung from a lever Q, pivoted on a fixed fulcrum $q$ and carrying a stud and roller $r$, that rests on a snail-cam S, driven from the chain-pulley C by spur-gear $c\ s$. The ratio of this gear is such that one revolution of the cam $s$ is performed in the time occupied by the chains B in traveling a distance equal to twice the distance apart of the sling-pivots $f$, so that the disengagement of the props I will take place each time a cage is picked up by a hook G, but not when a cage is set down by a hook G'. In the position illustrated the cage A is just about to be picked up and raised off the props, the action of the cam being so timed that immediately this occurs the weight P' is allowed to fall and to act through the rod P on the props I so as to throw them outward, and thus allow the cage to pass down between them. When the cage has passed down clear of the props I, the continued revolution of the cam $s$ causes the weighted rod P to be raised again to the position shown, and the props are caused by a weight T (or a spring) to fall inward to the position shown. As the next cage passes up between the props it forces them outward, this outward movement being permitted by the slot $p$, so that when the cage has risen to landing position the props are immediately returned by the weight T into position to receive and support the cage. Instead of the props being moved apart by a weight P', as shown at the right-hand side of Fig. 4, the rod P might, as shown in dotted lines at the left-hand side of the same figure, be the valve-rod of a steam or hydraulic cylinder U, whose piston-rod $u$ would be connected to a lever-arm, such as $M^2$, for working the props.

I claim—

1. A continuously-running apparatus for raising and lowering, comprising pendulous cage-carrying slings, a pair of endless chains to which said slings are pivoted, pairs of upper and lower pulleys upon which said chains run, guides adapted to bring the cages and the lower ends of the slings to a mid-position between the ascending and descending chain members at the upper and lower landing-points, means of temporarily supporting the cages at the landing-points, and means of detachable connection between the slings and cages, said means being automatically operated when the cages are stationary to cause the slings to enter into engagement with the cages and to become detached therefrom alternately, the slings being in number double that of the cages, substantially as and for the purpose described.

2. A continuously-running apparatus for raising and lowering, comprising pendulous cage-carrying slings, a pair of endless chains to which said slings are pivoted, pairs of upper and lower pulleys upon which said chains run, guides adapted to bring the cages and the lower ends of the slings to a mid-position between the ascending and descending chain members at the upper and lower landing-points, means of temporarily supporting the cages at the landing-points, and means of detachable connection between the slings and cages, said means of effecting connection consisting of hooks pivoted to the slings, the hooks of successive slings pointing in opposite directions and being adapted to be pivotally controlled by the guides so as to be thereby caused to enter into engagement with or become disengaged from the cages, as described.

3. In the herein-described continuously-running apparatus for raising and lowering, the cages, the pendulous cage-carrying slings, the carrier for the slings, the hook connections, and means of operating the same for connecting and disconnecting the cages alternately with and from the pendulous slings, substantially as described.

4. In the herein-described continuously-running apparatus for raising and lowering, the cages, the cage-carrying slings, the endless carrier for the same, means for connecting and disconnecting the cages alternately with and from the slings at the landing-stages, removable cage-supports at the upper landing-stage, and means of automatically operating the said cage-supports in proper time relation to the picking-up operation by the slings, as described.

DAVID DAVY.

Witnesses:
THOMAS W. KENNARD,
C. G. CLARK.